P. TATARYN.
LAWN MOWER.
APPLICATION FILED APR. 11, 1918.
1,279,038.
Patented Sept. 17, 1918.
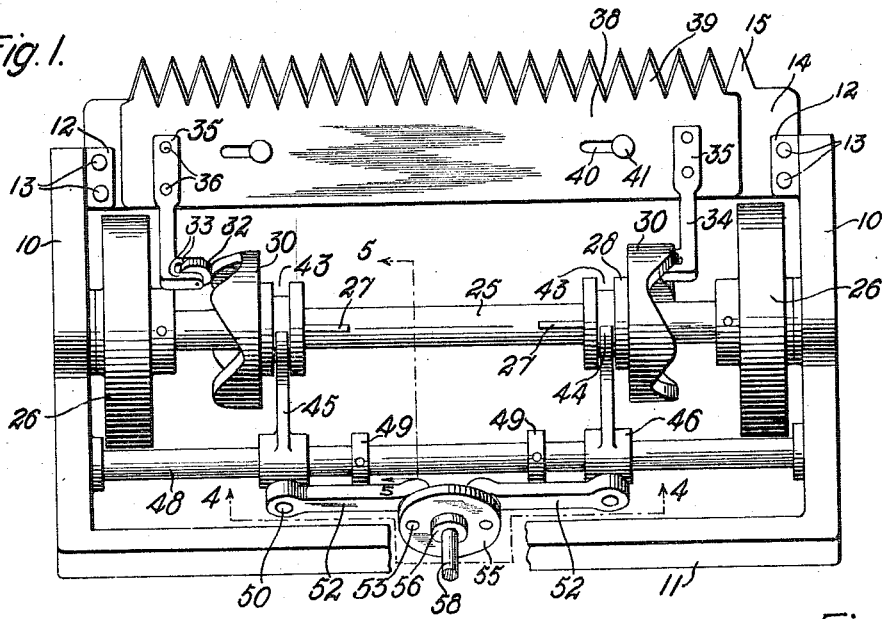
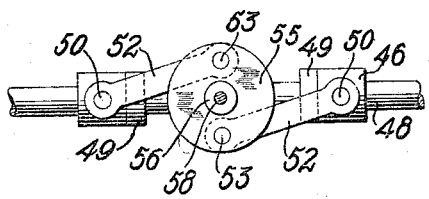
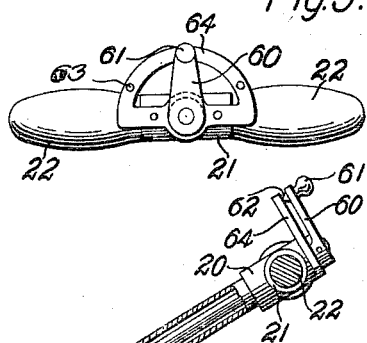
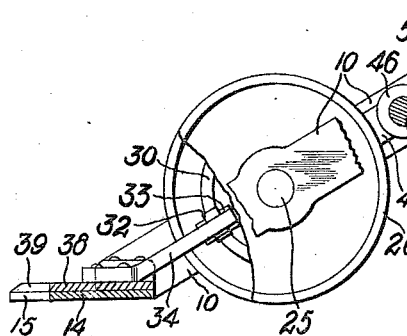
Inventor:
Petro Tataryn.
by Oscar Gill
Attorney.

UNITED STATES PATENT OFFICE.

PETRO TATARYN, OF CHESTER, PENNSYLVANIA.

LAWN-MOWER.

1,279,038.

Specification of Letters Patent.

Patented Sept. 17, 1918.

Application filed April 11, 1918. Serial No. 227,873.

*To all whom it may concern:*

Be it known that I, PETRO TATARYN, a subject of the Emperor of Austria, residing at Chester, county of Delaware, and State of Pennsylvania, have invented certain new and useful Improvements in Lawn-Mowers, of which the following is a specification.

This invention relates to improvements in lawn mowers and particularly to types adapted to be manually operated.

The principal object of the invention is to provide a lawn mower comprised of few and simple parts, capable of easy manipulation and which requires but a minimum of effort in its operation.

Another object of the invention is to provide means whereby the cutting elements may be rendered inoperative at any desired time, as during the movement of the machine over walks.

These and other like objects are attained by the novel construction and combination of parts hereinafter described and shown in the accompanying drawing, forming a material part of this disclosure, and in which:—

Figure 1 is a fragmentary top plan view showing a lawn mower made in accordance with the invention.

Fig. 2 is a partial side elevational and vertical sectional view of the same.

Fig. 3 is a fragmentary end view looking at the handle or propelling end of the implement.

Fig. 4 is a fragmentary sectional view taken on line 4—4 of Fig. 1, and

Fig. 5 is a like fragmentary transverse view taken on line 5—5 of Fig. 1.

The implement comprises a rigid frame, having side elements 10, connected integrally by a bar 11, while at the front are formed inwardly extending flanges 12, through which pass rivets 13 securing the guard plate 14, provided with extending knife guards 15.

Formed with the bar 11, at the center thereof, is a raised boss or hub 18, in which is fixed the lower end of a tubular handle 19, terminating in the center opening 20, of a T-shaped element in the lateral element 21, of which are secured the transverse wooden handle bars 22, thus supplying means whereby the implement may be moved along a level surface and efficiently guided by the same.

A shaft 25, is journaled in the frame sides 10, and has mounted upon it, near the sides, a pair of traction wheels 26, the same acting as a truck upon which the implement is supported.

Fixed in the shaft 25 are a pair of keys 27 and engaged so as to slide freely on the shaft, are the hubs 28, of a pair of oppositely disposed side cams 30, the same being so arranged that the high points on one cam are directly opposite the low points on the opposite cam.

Adapted to make contact with the faces of the cams 30, are rollers 32 mounted to freely rotate in forks 33, formed with arms 34 having upon its base, pads 35, secured by rivets 36 to the upper, movable cutter blade 38, provided with sharply beveled teeth 39, coöperative with the teeth 15, of the lower plate 14, so that a shearing action is obtained between the same.

The plate 38 contains a pair of longitudinally disposed slots 40, through which passes the shank of securing studs 41, the enlarged heads of which act to maintain the cutter blade in intimate relation with the guide plate 14, upon which it rests, and in which the lower ends of the studs are rigidly affixed. Thus as the wheels are rotated by advancing the implement, the cams are caused to rotate and move the cutter plate 38 reciprocatively and continuously in an obvious manner, when the cams are in the position indicated in Fig. 1.

In order to provide means whereby the cutter blade may remain quiescent during the advancement of the apparatus, the hubs 28 of the cams are formed with annular recesses 43 and operative therein are the forks 44 of arms 45, having enlarged elongated hubs 46, slidably mounted upon a bar 48, secured in the end frame 10, parallel with the end shaft 25, and provided with limiting collars 49. Extending oppositely from the hubs 46, are pins 50, upon which are connected the outer ends of a pair of links 52, the opposite inner ends of the links being similarly pivotally engaged upon pins 53, set in the outer face of the disk 55, having a hub 56. Secured in the hub and disk is a spindle 58, the same extending through the bar 11, tubular handle 19, and handle connection 21 to a lever arm 60, extending above the handle bars 22, and provided with an operating knob 61, having an extending point 62, engageable within openings 63 formed in a sector 64, arranged upon the extending T fitting 21.

Thus when it is desired to operate the cutter blades the lever 60 is manipulated so as to force the cams outward upon axle shaft 25, whereupon an oscillating motion is conveyed to the cutter plate 38, and conversely, when it is desired to permit the cutter plate to remain quiet, the lever is so operated as to cause the cams 30 to move toward the center, sliding on the keys 27, such movement obviously freeing the rollers 32 so that no motion is communicated to the cutter blade.

The foregoing description taken in connection with the drawings, is believed to be sufficiently clear to permit one to make and operate a lawn mower in accordance with the invention.

Having thus described my invention what I claim as new and desire to secure by Letters Patent, is.

1. In a lawn mower, the combination with a rigid frame, a pair of traction wheels mounted therein, an axle journaled in said frame upon which said wheels are fixed, a pair of opposed, lateral faced cams secured upon said axle, a fixed cutter blade carried in advance of said frame, a reciprocating cutter blade movable on said fixed blade, arms extending from said reciprocating cutter blade, rollers carried at the extremities of said arms, said rollers contacting with the faces of said cams, means for propelling said frame, and means operative in said propelling means and connected to said cams whereby said cams may be moved longitudinally on said axle into or out of contact with said rollers.

2. A lawn mower comprising a frame, cutting means on said frame at the forward part thereof, an axle journaled in said frame, traction wheels secured upon said axle, a pair of opposed cams fixed upon said axle, operative connections between said cams and said cutter blades, a bar mounted parallel to said axle in said frame, hubs slidable on said bar, forks carried by said hubs engaged with said cams whereby they may be moved to or from each other, a hollow handle engaged with said frame by which the latter may be advanced, a rod passing through said hollow handle, means for rotating said rod, a disk affixed at the inner end of said rod and link connections between said disk and the hubs of said forks whereby they may be actuated.

In testimony whereof I have affixed my signature.

PETRO TATARYN.